Patented May 11, 1948

2,441,128

UNITED STATES PATENT OFFICE 2,441,128

POLYFLUORO FOUR-CARBON ATOM RING CARBOXYLIC ACIDS AND DERIVATIVES

Paul L. Barrick and Richard D. Cramer, Wilmington, Del., assignors to E. I. du Pont de Nemours & Company, Wilmington, Del., a corporation of Delaware No Drawing. Application September 3, 1943, Serial No. 501,148

10 Claims. (Cl. 260—464)

This invention relates to organic fluorine compounds and more particularly to fluorinated organic carboxylic compounds.

It has previously been proposed to produce organic fluorine compounds by the reaction of fluorine with various organic materials. Such investigations as have been made have shown that this reaction is extremely energetic and generally causes pyrolysis of the organic material, resulting in the formation of carbon, tar or other undesirable carbonaceous decomposition products. The usual methods of preparing organic fluorine compounds have been to replace chlorine or bromine with fluorine by means of various inorganic fluorinating reagents such as antimony fluorides, silver fluoride, or mercuric oxide and hydrogen fluoride but these hazardous, expensive methods, at best, yield mixtures, and their application is restricted to certain types of halogenated hydrocarbons. In view of the difficulty in preparing fluorinated compounds, it appears that the only fluorinated carboxylic acids which have been described are the fluoroacetic acids for which a convenient method of preparation has not yet been described.

We have now discovered a new class of stable, fluorine-containing carboxylic acids and their derivatives, and that said fluorine-containing compounds can be prepared readily without using dangerous or expensive inorganic reagents. Accordingly, this invention has as an object new fluorine-containing carboxylic acids and their derivatives. A further object is a new class of cycloorganic fluorine-containing carboxylic acids and their derivatives. A still further object is a new class of cycloorganic fluorine-containing carboxylic acids and their derivatives which contain a fluoro-substituted four-membered ring. Further objects reside in methods for preparing these compounds. Additional objects will become apparent from an examination of the following description and claims.

These and other objects and advantages are accomplished by the herein described invention which broadly comprises carboxylic acids and derivatives hydrolyzable thereto in which there is a fluorine-containing four-carbon atom ring. Members of this new class of carboxylic acids and derivatives hydrolyzable thereto are prepared by reacting an unsaturated carboxylic acid or a derivative hydrolyzable thereto with a polyfluoroethylene, i. e. a fluoroethylene containing at least two fluorine atoms, which is stable against polymerization on standing under pressure at 25° C. Said members are also prepared by oxidizing selected fluorine-containing four-carbon atom ring compounds.

The carboxylic acid derivatives referred to herein are those which upon hydrolysis yield a carboxylic acid, such as nitriles, esters, amides, N-substituted amides, anhydrides, salts, acid halides and the like.

The prefix "poly-" as used herein refers to the number of fluorine atoms and not to polymeric materials.

The following examples, in which proportions are given in parts by weight unless otherwise specified, are given for illustrative purposes and are not intended to place any restrictions or limitations on the herein described invention:

Example 1

A stainless steel autoclave was flushed with nitrogen, charged with 106 parts of acrylonitrile and was then cooled and evacuated. After adding 100 parts of tetrafluoroethylene containing less than 20 P. P. M. of oxygen, the autoclave was closed and heated at 125° C. for 17 hours with agitation. The reaction mixture was steam-distilled and the steam-volatile water-insoluble organic liquid was separated dried and distilled through a packed column. About 120 parts of 1-cyano-2,2,3,3-tetrafluorocyclobutane was obtained which had the following physical properties: B. P., 148–148.5° C.; $N_D^{25}$, 1.3568;

$$d_4^{25}, 1.3909$$

Ninety parts of the above cyanotetrafluorocyclobutane was treated with an aqueous 70% sulfuric acid solution and warmed gently under a reflux condenser for several hours. The reaction mixture soon became turbid and the hydrolysis appeared to be complete in about an hour. The upper oily organic acid layer was separated and the lower aqueous layer was diluted with water and extracted with ether. The organic acid and ether extracts were combined, dried, and the ether removed on a steam bath. Practically a theoretical yield of 2,2,3,3-tetrafluorocyclobutane monocarboxylic acid was obtained. Said acid had the following physical properties: B. P., 100–100.5° C./24 mm. (90° C./14 mm.); $N_D^{25}$, 1.3684;

$$d_4^{25}, 1.5103$$

and was found to solidify on cooling or on adding a seed crystal to give a solid melting at about 61.5–63° C.

A mixture of 150 parts of 2,2,3,3-tetrafluorocyclobutane carboxylic acid and 200 parts of acetic anhydride was placed in the still pot. The mixture was distilled slowly through a short column in order to remove acetic acid and acetic anhydride while adding 50 parts of fresh acetic anhydride to the still pot. The resultant tetrafluorocyclobutane carboxylic acid acid anhydride was distilled under reduced pressure to obtain about 100 parts boiling at 129–131° C./19 mm.

Forty-three parts of tetrafluorocyclobutane carboxylic acid was reacted with 60 parts of thionyl chloride and the mixture was warmed gently under a reflux condenser. When no more fumes were evolved, the excess thionyl chloride was removed. The carboxylic acid chloride was distilled under reduced pressure to obtain about 40 parts of 2,2,3,3-tetrafluorocyclobutane carbonyl chloride having the following properties: B. P., 70° C./124 mm.; $N_D^{25}$, 1.3782;

$$d_4^{25}, 1.4915$$

Two parts of tetrafluorocyclobutane carbonyl chloride from above was dissolved in 15 parts of benzene and was reacted with concentrated ammonia to prepare the corresponding amide. The resultant 2,2,3,3-tetrafluorocyclobutane carbonamide was a colorless crystalline solid melting at about 126–127° C. and was readily soluble in alcohol.

The corresponding anilide was obtained by reacting the tetrafluorocyclobutane carbonyl chloride in benzene with aniline. The 2,2,3,3-tetrafluorocyclobutane carbonanilide thus obtained was readily recrystallized from aqueous alcohol to yield a crystalline solid melting at about 116–117.5° C.

Example II

A silver-lined reactor was flushed with nitrogen and charged with 125 parts of hydroquinone-stabilized methyl methacrylate. After cooling and evacuating the autoclave, 100 parts of oxygen-free (less than 20 P. P. M.) tetrafluoroethylene was added, and the mixture was heated 16.5 hours at 125° C. The reaction mixture was steam-distilled and the steam-volatile organic material separated, dried and fractionated. A yield of about 168 parts of the methyl ester of 1-methyl-2,2,3,3-tetrafluorocyclobutane carboxylic acid boiling at about 78–79° C./84 mm. was obtained. It had the following properties: $N_D^{25}$, 1.3656;

$$d_4^{25}, 1.2890$$

Fifteen parts of the methyl ester of 1-methyl-2,2,3,3-tetrafluorocyclobutane carboxylic acid was treated with 110 parts of 20% sodium hydroxide and heated gently for about an hour under a reflux condenser until the ester layer disappeared. The sodium salt of 1-methyl-2,2,3,3-tetrafluorocyclobutane carboxylic acid was converted to the free acid by acidifying with dilute sulfuric acid. The 1-methyl-2,2,3,3-tetrafluorocyclobutane carboxylic acid was extracted with ether, dried and distilled under reduced pressure. It boiled at 100–100.5° C./19 mm. and had the following refractivity and density: $N_D^{25}$, 1.3744;

$$d_4^{25}, 1.4035$$

On cooling, the acid solidified to a colorless solid melting at about 41–43° C.

Example III

A stainless steel reactor was flushed with nitrogen and 125 parts of allyl cyanide added. The reactor was closed, evacuated, charged with 50 parts of tetrafluoroethylene, and the reaction mixture was heated at 150° C. for 8 hours. The reaction mixture was steam-distilled and the steam-volatile products were separated, dried and fractionated to yield tetrafluorocyclobutyl-acetonitrile boiling at about 192–195° C. and having the following index of refraction and density: $N_D^{25}$, 1.3748;

$$d_4^{25}, 1.3459$$

Example IV

A Pyrex glass flask, equipped with a water-cooled reflux condenser, was charged with 420 parts of 50% nitric acid, 1 part of ammonium metavanadate and 154 parts of 1-vinyl-2,2,3,3-tetrafluorocyclobutane. The reaction mixture was heated for about 16 hours at 75–80° C. and nitrogen oxide fumes were evolved. The reaction mixture was cooled to room temperature and the nitric acid-insoluble portion was separated and extracted with 10% sodium bicarbonate solution. The sodium bicarbonate extract was washed with ether and acidified. The organic material recovered on acidifying the bicarbonate solution was distilled under reduced pressure to obtain an acid boiling at 98–103° C./25 mm., the physical constants and analysis of which agreed with those for 2,2,3,3-tetrafluorocyclobutane carboxylic acid.

As hereinbefore stated, the novel compounds of this invention are carboxylic acids and derivatives hydrolyzable thereto in which there is a fluorine-containing four-carbon atom ring. Said compounds may be represented by the general formula RY in which R is an organic radical comprising a fluorine-containing four-carbon atom ring and Y is a radical selected from the group consisting of nitrile and non-oxo-carbonylic radicals. The non-oxo-carbonylic radicals include the following:

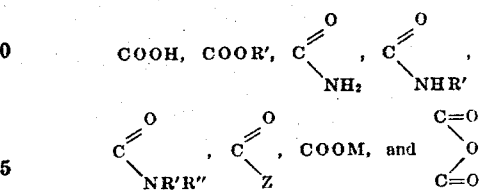

in which R' and R" are monovalent organic radicals, Z is a halogen and M is a salt-forming cation, such as ammonium, an alkali metal (e. g. sodium or potassium), an alkaline earth metal (e. g. calcium), and the like. It is apparent that the present invention comprises an extensive number of carboxylic acids and derivatives hydrolyzable thereto containing a fluorine-substituted four-carbon atom ring. The products of this invention can be more particularly described as monomeric carboxylic acids and derivatives hydrolyzable thereto having the general formula RY in which R is an organic radical containing a fluorocyclobutane or fluorocyclobutene ring and Y is a radical selected from the group consisting of nitrile and non-oxo-carbonylic radicals, attached to a carbon atom in the four-carbon atom ring. The fluorocarboxylic compounds, RY, contain at least two fluorine atoms attached to a four-carbon atom ring and a total of at least five carbon atoms.

Preferably, on account of the superior results thereby obtained, said ring contains at least 3 halogen atoms. For optimum results said ring contains at least 4 halogen atoms, preferably at least 4 fluorine atoms. While the four-carbon atom ring in the carboxylic acids and their said derivatives may be a fluorocyclobutane ring or a fluorocyclobutene ring, it is preferred, because of the superior properties of the product, that said ring be a fluorocyclobutane ring. The most useful compounds of this invention have the general formula

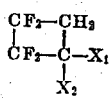

wherein $X_1$ and $X_2$ are monovalent radicals selected from the group consisting of hydrogen, halogens and monovalent organic radicals, at least one of said monovalent radicals being a radical selected from the group consisting of nitrile and non-oxo-carbonylic radicals. Examples of monovalent organic radicals contemplated include alkyl, alkenyl, alkynyl, cycloalkyl, aryl, aralkyl, alkoxy, ester, cyano, carboxyl, carbalkoxy, amido, acyl, formyl and methylol radicals.

As mentioned previously, the products of this invention can be prepared by heating a fluoroethylene with an unsaturated carboxylic acid or derivative hydrolyzable thereto. As examples of fluoroethylenes which can be employed in the present invention may be mentioned tetrafluoroethylene, trifluoroethylene, trifluorochloroethylene, 1,1-difluoro-2, 2-dichloroethylene, 1,2-difluoro-1,2-dichloroethylene, 1,1-difluoro-2-chloroethylene, trifluorobromoethylene, and vinylidene fluoride. The fluoroethylenes containing at least three halogens, at least two of which are fluorene, react more readily. However, the tetrahaloethylenes containing at least three fluorine atoms react most readily and are preferred. Especial significance is attached to the completely fluorinated ethylene, tetrafluoroethylene.

In order to provide the products of this invention the fluoroethylene employed in the above process should be stable against polymerization on standing under pressure at 25° C. The preparation of stabilized tetrafluoroethylene, which is not a part of this invention, can be accomplished by different means. One method consists in reducing the normally contained oxygen content (about 0.1% to 0.2% by volume) to not more than 40 parts of oxygen in a million parts of tetrafluoroethylene. Another method for stabilizing tetrafluoroethylene against polymerization consists in adding polymerization inhibiting compounds. Compounds of this kind are those containing thiol sulfur, examples of which are n-butyl mercaptan, hydrogen sulfide, etc., and compounds containing amine nitrogen, for example, ammonia, di- and tri-butyl amine, and other amines. These methods are described more fully in U. S. Patents No. 2,407,405, 2,407,419 and 2,407,396.

It is to be understood that any unsaturated carboxylic acid or derivative hydrolyzable thereto may be employed in the above process. As hereinbefore stated, these initial materials include carboxylic acids and their derivatives, such as nitriles, esters, amides, N-substituted amides, anhydrides, salts, acid halides, and the like, which on hydrolysis yield carboxylic acids. Said carboxylic acids and derivatives include ethylenic and acetylenic and acetylenic unsaturated compounds. Examples of ethylenic and acetylenic unsaturated mono- and dibasic carboxylic acids and derivatives contemplated are acrylic, methacrylic, alpha-alkyl-acrylic, alpha-phenylacrylic, vinylacrylic, methlenemalonic, alpha-chloroacrylic, itaconic, vinylacetic, propiolic, vinylbenzoic acids and their derivatives. All of these unsaturated carboxylic acids and derivatives contain a terminal methylene group. Said compounds have the general formula

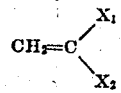

in which $X_1$ and $X_2$ are monovalent radicals selected from the group consisting of hydrogen, halogens and monovalent organic radicals, and in which at least one of said monovalent radicals contains a carboxylic acid group or a group capable of hydrolysis to a carboxylic acid group. Examples of monovalent organic radicals are alkyl, alkenyl, alkynyl, cycloalkyl, aryl, aralkyl, alkoxy, ester, cyano, carboxyl, carbalkoxy, amido, acyl, formyl and methylol radicals, and the like.

Examples of the reactions involved in the preparation of the carboxylic acids and derivatives of this invention by heating an unsaturated carboxylic acid or derivative hydrolyzable thereto with a fluoroethylene are:

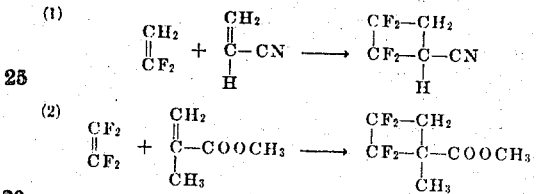

It will be understood that the operating conditions may vary widely depending largely upon the nature of the compounds which are being reacted and also upon the fluorocyclocarboxylic acid or derivative which is desired.

In the preparation of carboxylic acids and derivatives hydrolyzable thereto by reacting a fluoroethylene with an unsaturated carboxylic acid or derivative hydrolyzable thereto, it is desirable to carry out the reaction under substantially non-polymerizing conditions. In general, it is preferable to exclude polymerization catalysts and to sometimes use a small amount of polymerization inhibitor such as hydroquinone, "Terpene B" hydrocarbon, or tributyl amine. One reason why added inhibitors are not usually necessary may be due to mutually inhibitory action exerted by the fluoroethylenes and unsaturated carboxylic compounds. The proportions of inhibitors may vary within relatively wide limits depending largely upon the nature of the reactants. Generally speaking, very desirable results may be obtained with none or only relatively small amounts corresponding to .0001 to 3% by weight of the material treated. It is sometimes desirable to use a mixture of inhibitors since the effectiveness of the various inhibitors may not be the same for the fluoroethylene and for the unsaturated carboxylic acid or derivative.

The proportion of reactants may vary within relatively wide limits depending largely upon the nature of the reactants, the method of operation, and the results desired. Stoichiometrically, one equivalent of a fluoroethylene corresponds to one equivalent of a monoethylenic unsaturated carboxylic acid or derivatives hydrolyzable thereto. In general, an excess of the less expensive unsaturated carboxylic acid or derivative is desirable and in addition, the excess unsaturated carboxylic acid or derivative serves as a solvent for the reaction mixture. In some cases it is advantageous to add an inert solvent or diluent such as water to the reaction mixture to facilitate dissipating the heat in case the reaction is exothermic. The process may be operated continuously or intermittently. The reaction and the separation or isolation of the products may be carried out simultaneously or in separate steps. The reaction can be effected in a closed system or the reaction can be carried out in the vapor phase by mixing the vapors of the reactants and, if desired, by passing the mixture through a hot reaction tube. In general, the reaction is carried out under subatmospheric, atmospheric or superatmospheric pressure in the range of from .1 to 1000 atmospheres. Best results are obtained at a pressure within the range of from 1 to 200 atmospheres.

The temperature at which the reactions are effected may be varied over a wide range depending largely upon the nature of the reactants, the results desired and the other conditions of the reaction. Although it is usually desirable to carry out the reactions at elevated temperatures in order to decrease the time of reaction, the reactions may, however, take place at ordinary temperature or even at lower temperatures. The upper temperature limit is the temperature at which decomposition of the reactants and/or products occurs. Temperatures from 50 to 250° C. are preferred since best results are obtained therewith.

Although the reaction of fluoroethylenes with unsaturated carboxylic acids and derivatives hydrolyzable thereto is the preferred process for preparing the products of the present invention, it is to be understood that said products can be prepared by other procedures. For instance, another general method consists, as is illustrated in Example IV, in the careful oxidation of the fluorine-containing four-carbon atom ring compounds which are obtained by reacting tetrafluoroethylene with an aliphatic compound containing two carbon to carbon multiple bonds said mutliple bonds preferably being conjugated to each other. Examples of such compounds are: dienes, butadiene, chloroprene, isoprene, fluoroprene, piperylene; enynes, monovinylacetylene.

By way of illustration, the oxidation of the product obtained by reacting tetrafluoroethylene with butadiene is represented below:

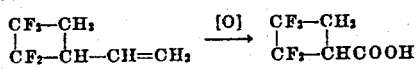

It is to be understood that the cyclic fluorocarboxylic acids and derivatives of the present invention, had for instance by reaction of a fluoroethylene with an unsaturated carboxylic acid or derivative hydrolyzable thereto, or by oxidation of a fluorine-containing four-carbon atom compound obtained by reacting tetrafluoroethylene with a diene, can be converted readily into other fluorine-containing four-carbon atom ring acids and their derivatives, particularly carboxylic compounds, by more or less standard organic chemical reactions. Examples of said reactions are:

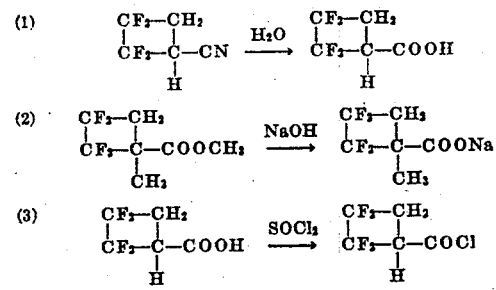

The equipment used in the prepartion of the products of this invention can be constructed of glass or of various metals such as iron, steel, aluminum, Monel metal, or copper.

The present invention is particularly advantageous in that it represents the first safe, flexible, practicable and economical method for producing fluorocarboxylic compounds of the character herein described. The products of this invention are useful for a wide variety of commercial purposes. Since the products of this invention are stable and not subject to ring opening on chlorination, oxidation, dehalogenation, dehydrohalogenation, etc., they are generally applicable as intermediates for preparing a wide variety of other fluorine-containing organic compounds. Many of the fluorocarboxylic acids and derivatives investigated have been found to be very desirable in the esterification of monohydric or polyhydric compounds such as alcohols, ethylene glycol, glycerol, ethylene chlorohydrin, cellulose, polyvinyl alcohol, etc., in order to decrease flammability.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. A compound having the formula

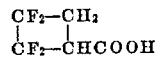

2. A compound having the formula

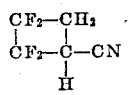

3. A compound having the formula

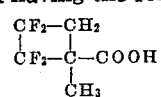

4. The process for obtaining the compound having the formula

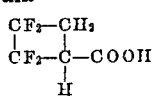

which comprises heating, at a temperature within the range of from 50° C. to 250° C. acrylonitrile with tetrafluoroethylene which is stable against polymerization on standing under pressure at 25° C., and thereafter hydrolyzing the resultant 1-cyano-2,2,3,3,-tetrafluorocyclobutane.

5. The process for obtaining the compound having the formula

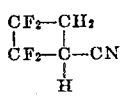

which comprises heating at a temperature within the range of from 50° C. to 250° C. acrylonitrile with tetrafluoroethylene which is stable against polymerization on standing under pressure at 25° C.

6. A monomeric polyfluorocyclobutane having the general formula

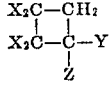

wherein the four X's are halogen atoms of which at least two are fluorine atoms, Y is a member selected from the group consisting of the carboxyl radical and radicals hydrolyzable thereto and Z is a member selected from the group consisting of hydrogen and alkyl.

7. A monomeric tetrafluorocyclobutane carboxylic acid in which the carboxyl group is attached at position 1 in said ring the remaining substituent at position 1 in said ring being alkyl, and in which the carbon atoms in positions 2 and 3 in said ring have attached thereto four fluorine atoms, position 4 in said ring being unsubstituted.

8. A monomeric polyfluorocyclobutane carboxylic acid in which the carboxyl group is attached at position 1 in said ring the remaining substituent at position 1 in said ring being alkyl, and in which the carbon atoms in positions 2 and 3 in said ring have attached thereto four halogen atoms, of which at least two are fluorine atoms, position 4 in said ring being unsubstituted.

9. The process for obtaining a monomeric polyfluorocyclobutane which comprises heating in the presence of a polymerization inhibitor at a temperature within the range of from 50° to 250° C. a tetrahalogenoethylene which contains at least two fluorine atoms with an acrylic compound of the general formula $$CH_2=C-Y$$
$$\phantom{CH_2=C-}Z$$

wherein Y is a member selected from the group consisting of the carboxyl radical and radicals hydrolyzable thereto and Z is a member selected from the group consisting of hydrogen and alkyl.

10. The process for obtaining a monomeric tetrafluorocyclobutane which comprises heating at a temperature within the range of from 50° to 250° C. tetrafluoroethylene rendered stable against polymerization on standing under pressure at 25° C. with an acrylic compound of the general formula $$CH_2=C-Y$$
$$\phantom{CH_2=C-}Z$$

wherein Y is a member selected from the group consisting of the carboxyl radical and radicals hydrolyzable thereto and Z is a member selected from the group consisting of hydrogen and alkyl.

PAUL L. BARRICK.
RICHARD D. CRAMER.

REFERENCES CITED

The following references are of record in the file of this patent:

UNITED STATES PATENTS

| Number | Name | Date |
| --- | --- | --- |
| 2,197,880 | Schroter et al. | Apr. 23, 1940 |
| 2,217,632 | Wolfe | Oct. 8, 1940 |
| 2,365,703 | Jahn | Dec. 26, 1944 |

OTHER REFERENCES

Perkin et al.: Jour. Chem. Soc. (London), vol. 61, page 42.

Perkin: Jour. Chem. Soc. (London), vol. 65, page 973.